US008578628B2

(12) United States Patent
Coles et al.

(10) Patent No.: US 8,578,628 B2
(45) Date of Patent: Nov. 12, 2013

(54) MILLING AND DRYING APPARATUS INCORPORATING A CYCLONE

(75) Inventors: Graeme Douglas Coles, Christchurch (NZ); Andrew James Rafferty, Christchurch (NZ); Karen Millicent Rafferty, legal representative, Christchurch (NZ)

(73) Assignee: Rich Technology Solutions Limited, Greta Valley, North, Canterbury (NZ)

(*) Notice: Subject to any disclaimer, the term of this patent is extended or adjusted under 35 U.S.C. 154(b) by 548 days.

(21) Appl. No.: 12/606,509

(22) Filed: Oct. 27, 2009

(65) Prior Publication Data
US 2010/0065669 A1 Mar. 18, 2010

Related U.S. Application Data

(63) Continuation-in-part of application No. 11/258,753, filed on Oct. 25, 2005, now abandoned, which is a continuation of application No. 10/362,408, filed as application No. PCT/NZ01/00177 on Aug. 29, 2001, now Pat. No. 6,993,857.

(30) Foreign Application Priority Data
Aug. 29, 2000 (NZ) ........................................ 506609

(51) Int. Cl.
F26B 17/00 (2006.01)
F26B 17/24 (2006.01)
B01D 21/26 (2006.01)
B01D 45/00 (2006.01)
B01D 45/12 (2006.01)

(52) U.S. Cl.
USPC ................ 34/591; 34/594; 34/58; 210/512.3; 55/427; 55/459.1

(58) Field of Classification Search
USPC .................... 34/591, 592, 594, 58; 241/5, 39; 406/173; 209/711; 210/512.3; 96/301; 55/425, 424, 427, 432, 430, 459.1
See application file for complete search history.

(56) References Cited

U.S. PATENT DOCUMENTS
2,717,695 A 9/1955 Martin
3,794,251 A 2/1974 Williams
(Continued)

FOREIGN PATENT DOCUMENTS
JP S57-153207 4/1986
JP S61-153166 7/1986
(Continued)

*Primary Examiner* — Kenneth Rinehart
*Assistant Examiner* — John McCormack
(74) *Attorney, Agent, or Firm* — McCormick, Paulding & Huber LLP

(57) ABSTRACT

A cyclone comprising: an upper cylindrical portion which opens into the wider end of a lower frusto-conical portion, with the longitudinal axes of said upper and lower portions aligned and substantially vertical; a primary air inlet into the cyclone arranged such that the inlet air is substantially tangential to the circumference of the cyclone; an exhaust outlet at or adjacent the top of the cylindrical portion; a control valve associated with said exhaust outlet and capable of partially or completely shutting off said exhaust outlet; a secondary air inlet associated with the narrow end of the frusto-conical portion and provided with an airflow stabilizing device which is adapted to admit a stream of air substantially along or spirally around the longitudinal axis of the cyclone; means for removing processed product from the cyclone; means for moving said airflow stabilizing device into and out of the narrow end of the frusto-conical portion during product processing and/or between product processing.

19 Claims, 4 Drawing Sheets

(56) References Cited

U.S. PATENT DOCUMENTS

| | | |
|---|---|---|
| 4,023,942 A | 5/1977 | Brady et al. |
| 4,248,699 A | 2/1981 | Hukki |
| 4,390,131 A | 6/1983 | Pickrel |
| 4,414,112 A * | 11/1983 | Simpson et al. ............ 210/512.1 |
| 4,431,405 A | 2/1984 | Eatherton |
| 4,743,364 A | 5/1988 | Kyrazis |
| 4,789,476 A | 12/1988 | Schulz |
| 4,992,043 A | 2/1991 | Lockwood, Jr. |
| 5,070,624 A * | 12/1991 | Vero et al. ........................ 34/429 |
| 5,236,132 A | 8/1993 | Rowley, Jr. |
| 5,681,450 A * | 10/1997 | Chitnis et al. ................. 208/113 |
| 6,206,202 B1 | 3/2001 | Galk et al. |
| 6,993,857 B2 | 2/2006 | Coles et al. |
| 7,213,381 B2 * | 5/2007 | Zitella et al. ................. 53/139.7 |

FOREIGN PATENT DOCUMENTS

| | | |
|---|---|---|
| JP | 06238197 A * | 8/1994 |
| JP | H06-238197 | 8/1994 |
| JP | H11-10022 | 5/1998 |
| WO | WO 85/01454 | 4/1985 |
| WO | WO 96/40840 | 12/1996 |

* cited by examiner

MILLING AND DRYING APPARATUS INCORPORATING A CYCLONE

CROSS REFERENCE TO RELATED APPLICATION

This is a continuation-in-part of U.S. application Ser. No. 11/258,753 filed Oct. 25, 2005.

TECHNICAL FIELD

The present invention relates to milling and drying apparatus which incorporates a cyclone, and to methods of operation of such apparatus.

BACKGROUND OF THE INVENTION

The use of a cyclone to separate, mill, or dry material is known, and various applications of cyclones have been described in a number of prior art specifications. For example, U.S. Pat. No. 5,236,132 (Rowley) discloses a comminutor/dehydrator which incorporates a cyclone, as does U.S. Pat. No. 4,390,131 (Pickrel). U.S. Pat. Nos. 4,743,364 and 6,206,202 both disclose classifying/separating apparatus incorporating a cyclone. However, the prior art designs in general fail to provide fine control of processing conditions within the cyclone. This in turn limits the range of products which can be processed, and also limits the quality of the output product. Further, most if not all of the known comminuting/dehydrating cyclones operate only batch processes.

OBJECT OF THE INVENTION

It is an object of the present invention to provide apparatus which incorporates a cyclone and which is capable of continuously milling and/or drying a large range of different products with fine control over the particle size/moisture content of the output product.

DISCLOSURE OF INVENTION

The present invention provides a cyclone comprising: an upper cylindrical portion which opens into the wider end of a lower frusto-conical portion, with the longitudinal axes of said upper and lower portions aligned and substantially vertical; a primary air inlet into the cyclone arranged such that the inlet air is substantially tangential to the circumference of the cyclone; an exhaust outlet at or adjacent the top of the cylindrical portion; a control valve associated with said exhaust outlet and capable of partially or completely shutting off said exhaust outlet; a secondary air inlet associated with the narrow end of the frustro-conical portion and provided with an airflow stabilising device which is adapted to admit a stream of air substantially along or spirally around the longitudinal axis of the cyclone; means for removing processed product from the cyclone; means for moving said airflow stabilising device into and out of the narrow end of the frusto-conical portion during product processing and/or between product processing.

Preferably, said airflow stabilising device has an outer wall which is frusto-conical in shape and an interior tube through which air is supplied in use; said airflow stabilising device being dimensioned and arranged such that the narrow end of said frusto-conical outer wall is insertable in the narrow end of said frusto-conical portion of the cyclone.

Preferably, the interior tube is arranged to be movable into and out of the narrow end of the frusto-conical portion either together with and/or independently of the frusto-conical exterior of the airflow stabilising device. Movement of the airflow stabilising device into and out of the narrow end of the frusto-conical portion of the cyclone, and movement of the interior tube relative to the frusto-conical portion, can be achieved by any of a wide variety of suitable devices, e.g. manual adjustment, electric motors, electric stepper motors, hydraulic rams, pneumatic rams; a person skilled in the art will appreciate that still further devices could be used for these movements, to suit particular applications.

The means of removing the processed product may be an annular gap at the narrow end of the frusto-conical portion between the wall of the frusto-conical portion and the airflow stablising device through which product is emitted in use. However, another possibility is that means of removing processed product are provided in the form of one or more outlets formed in the wall of the frusto-conical portion of the cyclone, through which product may be withdrawn.

Preferably, the cyclone further comprises a cylindrical core mounted within the upper cylindrical portion of the cyclone, with the longitudinal axis of the cylindrical core parallel to, or coincident with, the longitudinal axis of said upper cylindrical portion.

The present invention further provides a method of operating a cyclone as described above, wherein the airflow stabilising device is supplied with air from a blower or fan or, in the alternative, the airflow stabilising device is supplied with air simply by permitting air at ambient pressure to pass into said device. The air may be heated or unheated.

BRIEF DESCRIPTION OF THE DRAWINGS

By way of example only, preferred embodiments of the present invention are described in detail with reference to the accompanying drawings, in which.

BEST MODE FOR CARRYING OUT THE INVENTION

Figure 1:
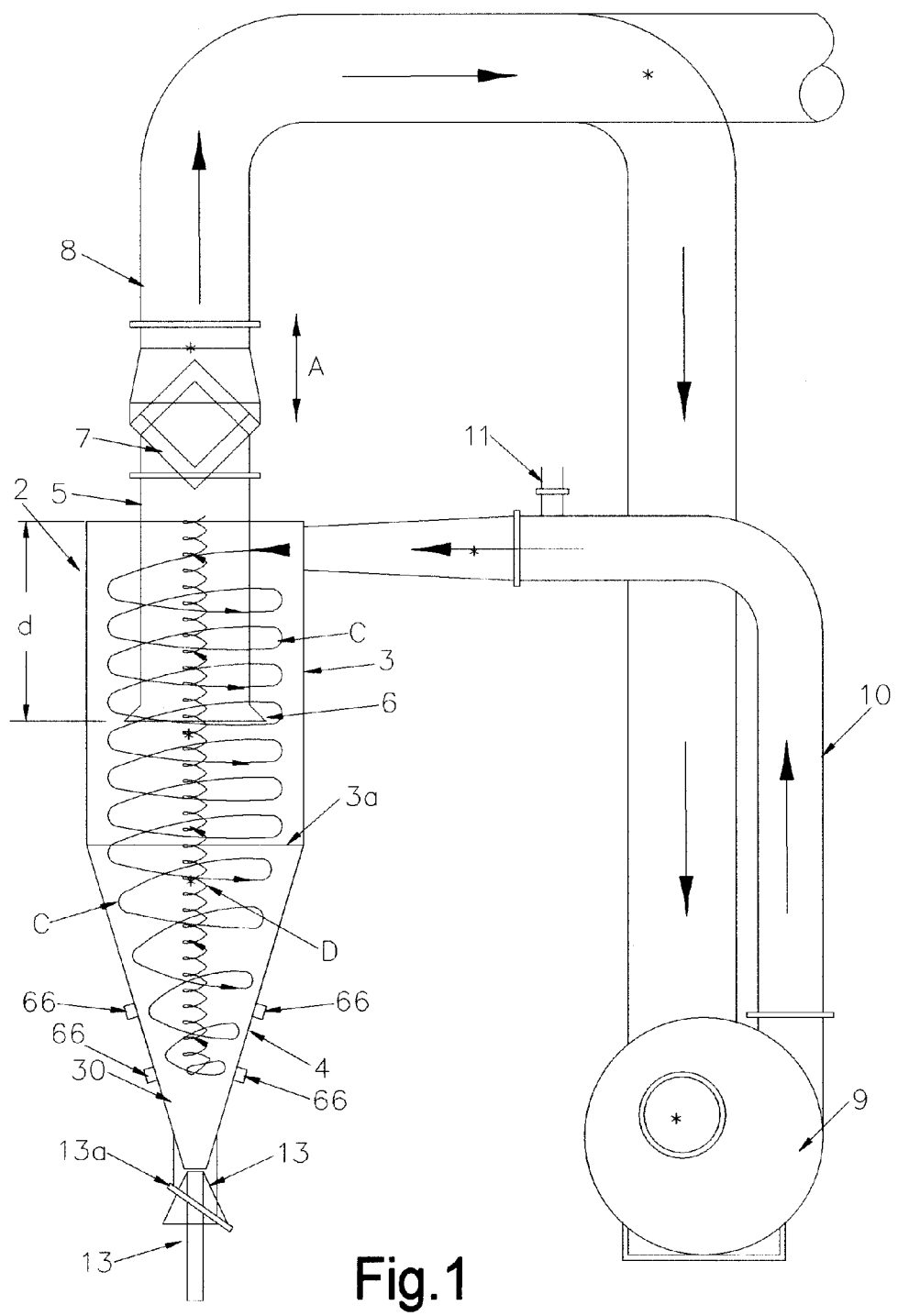
FIG. 1 is a diagrammatic side view of apparatus in accordance with the present invention.
Figure 2:
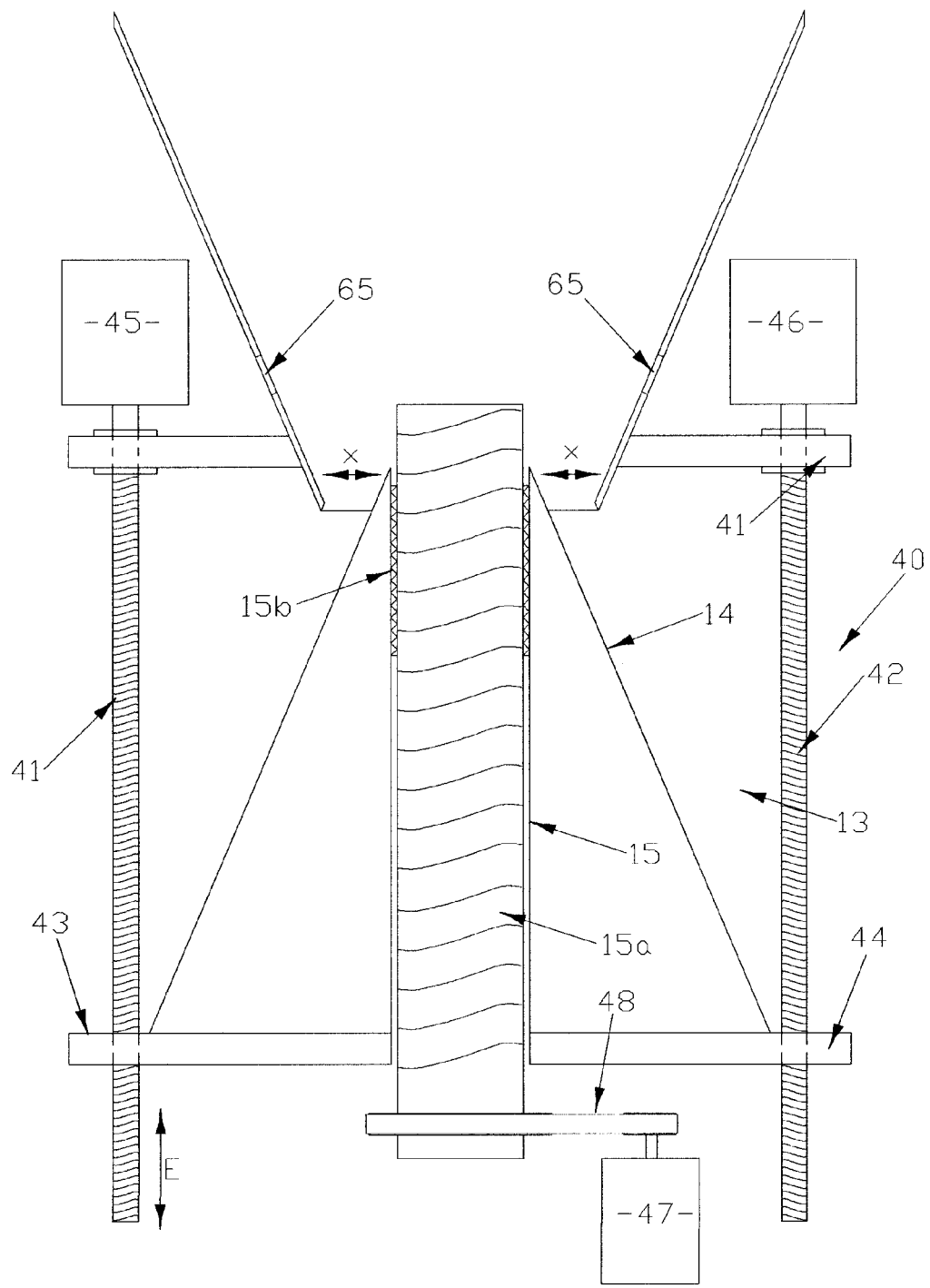
FIG. 2 is a view of the lower portion of FIG. 1 on a larger scale.

Referring in particular to FIGS. 1 and 2, a cyclone 2 comprises an upper cylindrical portion 3, the lower end 3a of which opens into the upper end of a frusto-conical portion 4, which is arranged coaxially with the cylindrical portion and with the smaller end lowermost. The longitudinal axis of the cyclone 2 is substantially vertical.
withdrawn.

A cylindrical core 5 is mounted in the top of the cylindrical portion 3, with the longitudinal axis of the core 5 coaxial with the longitudinal axis of the portion 3. The upper end of the core 5 projects from the top of the cylindrical portion 3, which is otherwise closed. The lower end of the core 5 is formed with a flared portion 6, the length of which is adjustable. The distance by which the core 5 projects into the cylindrical portion 3 can be adjusted using any suitable known means, (e.g. screw adjusters or hydraulic rams (not shown)).

When the cyclone is in operation, the core 5 physically separates the relatively hot, dry exhaust gases from the relatively cool and wet inlet air and entrained product. In addition, the core 5 acts as a heat exchanger:—the core is heated by the exhaust gases, and this is transferred to the relatively cool inlet air by conduction, convection and radiation. This effect is particularly marked at relatively low inlet air velocities.

The more the core 5 is lowered down the cylindrical portion 3, the greater the volume of air and entrained material in the area between the top of the portion 3 and the flange 6. This gives an increase in dwell time which can be useful for ensuring complete processing, especially when the inlet air through the duct 10 has a relatively low velocity and/or when very fine materials are being processed. The above described retention effect is increased by enlarging the outer diameter of the flange 6.

A conical valve 7 is mounted at the top end of the cylindrical core 5 and can be raised or lowered in the direction of arrows A to partially or completely close off the top of the core 5. The more the top of the core 5 is closed off, the greater the backpressure in the cyclone and in particular, the greater the pressure in the inner vortex, as hereinafter described.

The top end of the cylindrical core 5 opens into an exhaust duct 8, the other end of which may be vented to atmosphere and/or connected to the inlet of a blower or fan 9, as more particularly described with reference to FIG. 3. The outlet of the blower 9 is connected to an air inlet duct 10 which opens into the side wall of the cylindrical portion 3, adjacent the top of that portion.

The delivery side of a product inlet device 11 opens into the air inlet duct 10. The device 11 may be of any suitable known type, (e.g. a rotary valve for solids or an injection nozzle for liquids) and is in communication with a source of the product to be processed in the cyclone, such as a feed hopper (not shown in FIG. 1). When the device 11 is open, product to be processed flows through the valve, is entrained in the stream of air passing through the air inlet duct 10, and is swept into the upper part of the cyclone 2.

The air and entrained product coming into the cyclone from the duct 10 is admitted approximately tangentially to the circumference of the cylindrical portion 3, and preferably as close to the top of the cylindrical portion 3 as possible, so that product has a maximum dwell time within the cyclone. Once inside the cyclone, the air and entrained product initially follow a spiral path around the inner walls of the cyclone, as indicated by arrows C, spiralling around the cyclone down towards the narrow end of the frusto-conical portion 4. This forms a relatively high-pressure first vortex adjacent the walls of the cyclone. Adjacent the narrow end of the frusto-conical portion 4, a reverse spiral flow forms a second vortex (as indicated by arrows D) which extends from point adjacent the lower end of the cyclone to the top of the cyclone, approximately along the longitudinal axis of the cyclone.

This pattern of airflow within the cyclone produces a relatively stable pattern of velocity and pressure variations across the width of the cyclone, i.e. in a substantially horizontal plane. The air velocity varies inversely with the air pressure. It will be appreciated that the actual air velocities and pressure at any given point depend upon the air inlet velocity and pressure and the dimensions of the cyclone, but once the cyclone is in operation and the pattern of airflow is established, there is a consistent horizontal pattern of a low velocity/high-pressure zone immediately adjacent the cyclone walls, then the area of the first vortex, which is high velocity and correspondingly low pressure, then a transition zone between the first and second vortices, in which the air velocity gradually drops, reaching zero at the interface between the two vortices, and then increases (reversed in direction) towards the core of the second vortex, with the pressure varying inversely to the velocity.

The entrained product does not move in a smooth spiral around the cyclone:—the particles of the product impact upon each other and upon the walls of the cyclone; this has the effect of comminuting/milling the product, and is the main comminuting effect if the product being processed is noncellular. However, if the product is cellular, (e.g. fruit, vegetables, cereals, clays) then the main comminuting/milling effect is caused by the movement of the product between the high and low pressure in areas described above:—as the cellular particles move from a high pressure area to a lower pressure area, the material on the outside of the particle tends to spall under the pressure differential. Further, any water contained in the particles evaporates rapidly as the particle moves to a lower pressure zone; this evaporation may be sufficiently rapid to "explode" the particle. As the particles break down, more of the particle surface is exposed, and this of course facilitates further evaporation.

The final particle size of the product depends upon the inlet velocity of the air into the cyclone, the dwell time of the product in the cyclone, and the nature of the product itself:—obviously, some products are more brittle than others and fracture more readily under impact.

The product is dried by tumbling in the air stream, causing evaporation both of surface moisture and of moisture contained within the product, as described above. The rate of drying is governed by the air temperature and humidity and by the rate at which the product is comminuted:—a product which breaks up rapidly into small particles is dried more rapidly, since the drying air can contact the greater surface area of the product.

Although hot air obviously will dry more effectively than cooler air, for a majority of organic products it is advantageous to keep the temperature of the product as low as possible, preferably no higher than 50° Centigrade. For such products, although the inlet air temperature is typically in the range 70-85° Centigrade, evaporative cooling of the product plus the very short dwell time in the cyclone (typically 0.1 second for relatively dry product up to about three or four seconds for very wet product) helps to keep the heating of the product to a minimum:—typically, the exit temperature of the product is about 35° Centigrade.

However, for products which will tolerate a higher drying temperature, using inlet air at a higher temperature improves the efficiency of the apparatus:—for example, an air inlet temperature above 75° Centigrade gives extremely efficient operation and inlet air temperatures up to 150° C. have been used successfully for some products. It will be appreciated that it is important that the temperature of the circulating air mass in the cyclone is maintained at a temperature which is not damaging to the product being dried, and the optimum inlet air temperature for each particular type of product is determined by experimentation since the temperature of the circulating air mass in the cyclone is not dependent only upon the inlet air temperature:—it is affected also by the temperature of the material to be dried, the type of material to be dried and the volume of material being dried relative to the volume of inlet air.

Temperature sensors marked by * in FIG. 1 measure the temperature at the following places:

a) inlet of the blower 9
b) in the duct 10
c) at the start of the exhaust duct 8
d) midway along the exhaust duct 8
e) at the base of the cyclone
f) at the mid-point of the cyclone
g) at the lower edge 6 of core 5.

The temperature of the exhaust air generally is higher than the inlet air temperature; due to the use of the cylindrical core 5 as a heat exchanger, this temperature differential is used to heat the inlet air, resulting in a high efficiency operation. It is believed that a possible explanation for the heating of the exhaust air is that water vapour evaporated from the product may be moved to the higher pressure areas of the cyclone due to the water vapour activity gradient. Effectively, such water vapour may be considered super cooled and if nucleation sites are present (provided for example by fine particles in the exhaust air), the water vapour will condense, releasing its heat of evaporation which heats the surrounding air. It seems probable that this mechanism typically would occur inside the cylindrical core 5.

In conventional designs of cyclone, the position in the cyclone of the first and second vortices, and the level in the cyclone at which the airflow from the first vortex reverses to form the second vortex, tend to vary substantially during the period of operation of the cyclone:—the patterns of air movement are not stable, and the vortices precess about their average positions. However, for the cyclone to operate reliably and consistently, it is important that the vortices are as stable as possible, since their position governs the levels at which particles are deposited on the cyclone wall by the air stream, and also the size of particle which is deposited. Further, if the second vortex moves too close to the wall of the cyclone, it entrains some of the processed material which has been deposited there, and draws it into the exhaust system. This wastes processed material and also contaminates the exhaust gases.

It has been discovered that it is possible to stabilise the vortices by introducing a secondary flow of air into the lower end of the cyclone, using an externally-mounted airflow stabilising device 13 (which is shown on an enlarged scale in FIGS. 2 and 2*a*) to admit a secondary stream of air into the lower end of the cyclone, along or spiralling around the longitudinal axis of the cyclone. This secondary air stream may be at the same velocity and pressure as the primary air stream admitted through the inlet duct 10, or may be at a different velocity/pressure (including ambient pressure).

The airflow stabilising device 13 has a partly frusto-conical exterior 14 and a central cylindrical bore 15 which receives a tube 15*a* as a sliding fit or as a screw-threaded connection as indicated by reference 15*b*. The longitudinal axis of the bore 15 is aligned with the longitudinal axis of the cyclone 2. In an alternative construction (not shown), the bore 15 and tube 15*a* may be flared to produce a Venturi effect. The exterior 14 and the tube 15*a* can be advanced into or withdrawn from the end of the cyclone as indicated by arrows E, either together or independently of each other. An annular gap X is formed between the exterior wall of the frusto-conical portion 14 of the device 13 and the lower end of the cyclone. The size of the gap X may be varied by moving the device 13 towards or away from the cyclone.

The airflow stabilising device 13 is mounted on the exterior of the apparatus, immediately below the lower end of the cyclone. The device 13 is supported by means of a frame work 40 consisting of a first stationary cross bar 41 which is rigidly secured to the cyclone a short distance above the lower end of the cyclone and is substantially horizontal. Two vertical screw-threaded rods 41,42 are mounted one at each end of the cross bar 41 so as to extend downwards below the lower end of the cyclone. The second cross bar is split into two aligned sections 43,44; one of the sections 43 is mounted adjacent one end on the corresponding threaded rod 41 and a portion of the remainder is rigidly secured across part of the diameter of the exterior 14, along its lower edge. The other cross bar 44 is arranged in a similar manner, with one end engaged with the threaded rod 42 and at least part of the remainder of the cross piece 44 secured across a diameter of the lower edge of the exterior 14. The cross pieces 43 and 44 thus reinforce the exterior 14 along its lower edge and also mount the device 13 for movement in the direction of arrows E. Rotation of the rods 41,42 moves the device 13 and the cross pieces 43,44 up or down relative to the cyclone, depending upon the direction of rotation of the rods 41,42. The rotation of the rods 41,42 can be achieved manually, simply by rotating one or both ends of each rod, or, as shown in FIG. 2, by the use of electric motors 45,46 mounted on the cross piece 41 and connected to the upper ends of, respectively, the rods 41 and 42. Preferably these motors are electric motors, especially stepping electric motors. However, any other suitable drives could be substituted, e.g. hydraulic drives.

The tube 15*a* is connected to the exterior 14 by a screw-threaded connection 15*b* between the bore 15 and the exterior of the tube 15*a*. This screw-threaded connection may be only a short section as indicated by reference numeral 15*b*, or may be a longer section or even the full length of the tube if necessary. To move the tube 15*a* relative to the exterior 14, the tube 15*a* is rotated by a motor 47 and drive 48 to move up or down in the direction of arrows E, depending upon the direction of rotation of the tube. The motor 47 and drive 48 are supported by one or both of the cross pieces 43,44 but the connection is omitted from FIG. 2 for clarity.

In another arrangement, the screw-threaded connection 15*b*, motor 47 and drive 48, are omitted and the tube 15*a* is simply a sliding fit in bore 15. In this case, the tube 15*a* can be moved in the direction of arrows E with the exterior 14 as described above, and if it is necessary to move the tube 15*a* relative to the exterior 14, the position of the tube 15*a* relative to the exterior 14 is adjusted manually, or by hydraulic or pneumatic rams (see below).

Figure 2A:
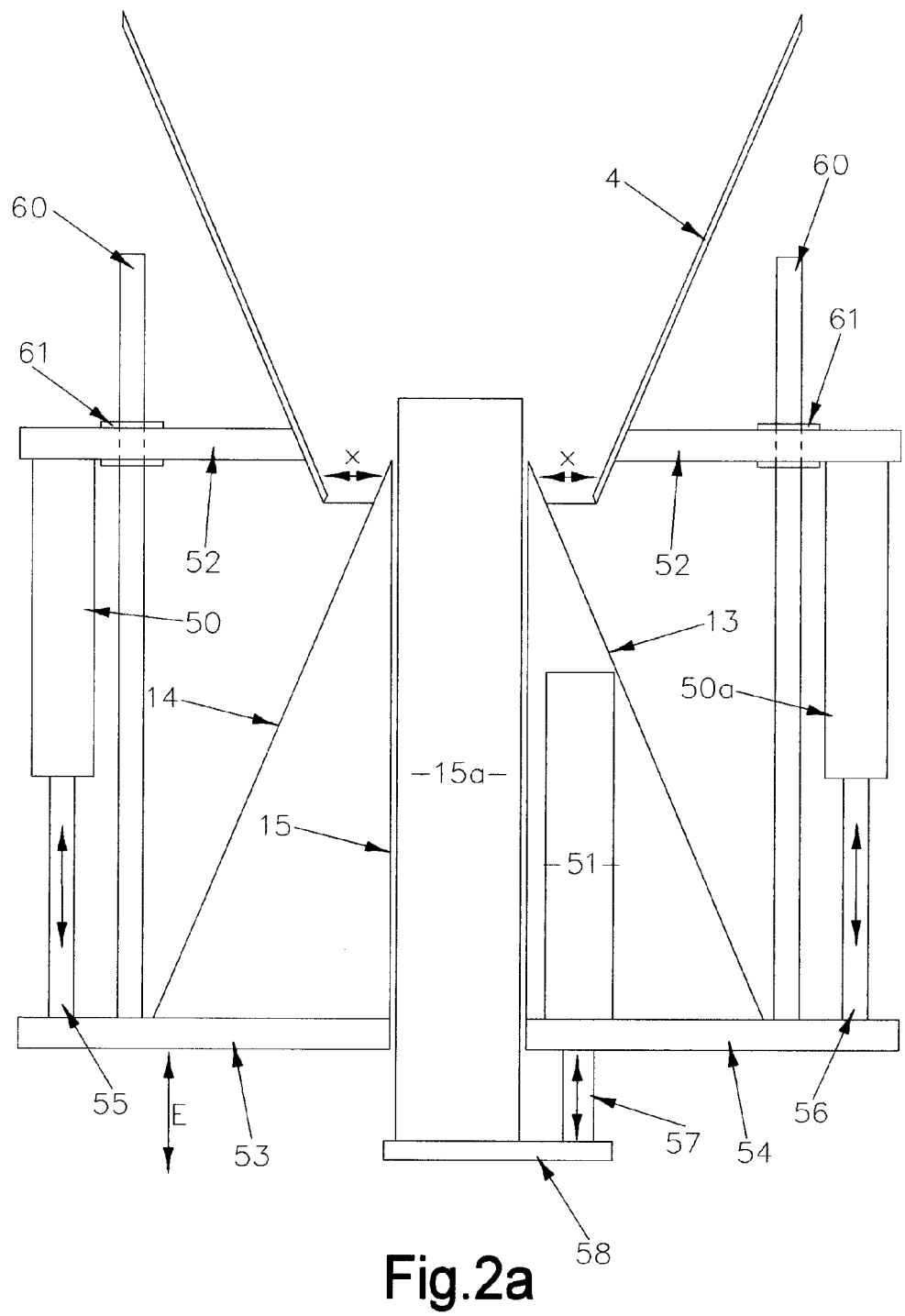
FIG. 2a is a view similar to FIG. 2, but showing another embodiment.

A further possible construction is shown in FIG. 2*a*. In this arrangement, the airflow stabilising device 13 can be moved relative to the base of the cyclone 4 on a pair of hydraulic or pneumatic rams 50,50*a* which move the exterior 14 together with the tube 15*a*, as indicated by arrows E, so that the exterior 14 and the tube 15*a* can be advanced or into or withdrawn from the end of the cyclone as described above. The tube 15*a* may also be moved relative to the exterior 14, using a further pneumatic or hydraulic ram 51.

As in the embodiment described with reference to FIG. 2, the airflow stabilising device 13 and the associated rams 50,50*a*,51 are mounted upon a horizontal crossbar 52 which is rigidly secured to the cyclone a short distance above the lower end of the cyclone.

A second crossbar is split into two aligned sections, 53,54; one of the sections 53 is rigidly secured across part of the diameter of the exterior 14, along its lower edge, and extends beyond the outer edge of the exterior 14 to receive the outer end of the rod 55 of the ram 50. The other crossbar 54 is rigidly secured across part of the diameter of the exterior 14 along its lower edge and is aligned with the crossbar 53 in a horizontal plane. The crossbar 54 extends beyond the outer edge of the exterior 14 to receive the outer end of the rod 56 associated with the ram 50*a*. Operation of the rams 50,50*a* to reciprocate the corresponding rods 55,56 thus moves the crossbar 53,54 in the direction of arrows E and thus moves the airflow stabilising device into or out of the lower end of the cyclone. The construction is stabilised by two spaced vertical guide rods 60, each of which extends through the crossbar 52 in a bearing 61, to allow the rods 60 to slide relative to the crossbar 52 when the rams 50,50*a*, are operated.

In the embodiment shown in FIG. 2a, the tube 15a is shown as a sliding fit within the exterior 14, although the clearance between the outer wall of the tube 15a and the interior wall of the exterior 14 is exaggerated for clarity. Movement of the tube 15a relative to the exterior 14 is by means of a third pneumatic or hydraulic ram 51 which is mounted upon a platform secured to the crosspiece 54 and includes a rod 57 which is rigidly secured to a substantially horizontal plate 58 secured across the lower end of the tube 15a. Reciprocation of the rod 57 using the ram 51 thus moves the tube 15a into or out of the lower end of the cyclone 4, independently of the exterior 14.

Movement to the tube 15a may also be achieved using a screw threaded connection between the exterior of the tube 15a and the interior of the bore 15 through the exterior 14, using the same arrangement as described with reference to FIG. 2, i.e. rotating the tube 15a by means of a motor 47 and drive 48.

It will be appreciated that the arrangement shown in FIG. 2a could in fact be inverted, with the rams 50,50a,51 being supported below the airflow stabilising device 13. In this position, the rams could be supported either from the floor below the cyclone 4 or from a framework rigidly secured adjacent the lower end of the cyclone.

FIG. 2a shows two rams 50,50a, and a single ram 51. However, a single ram, or multiple rams, may be used instead.

The object of the airflow stabilising device 13 is to stabilise the vortices, particularly the second vortex, so that it does not substantially vary in position within the cyclone. This means that the second vortex will reliably pick up under-processed material from higher up the cyclone, but will not disturb the adequately processed material which has been deposited in the lower part of the cyclone. The natural patterns of airflow in the cyclone, as shown in FIG. 1, tend to produce a dead zone 30 in the lowermost part of the cyclone, adjacent the open lower end. For the cyclone to operate efficiently, the material deposited in the dead zone 30, which will in due course flow out of the lower end of the cyclone through the gap X, should be of the target particle size and density and degree of dryness. Further, any of the less dense and larger particles which have been deposited on the cyclone walls higher up the cyclone should be re-entrained in the airflow for further processing.

Without the airflow stabilising device 13, the material leaving the cyclone through the gap X tends to be very mixed in particle size, since the precessing of the second vortex means that some particles are over processed and some particles which require further processing fail to be re-entrained and end up in the dead zone.

The use of the airflow stabilising device 13 not only makes the establishment of the vortices much more reliable, but also makes the position of the second vortex adjustable:—the more the tube 15a is advanced into the base of the cyclone, the more the lower end of the second vortex is raised, and the larger the dead zone 30. Since the particles in the dead zone eventually will pass out of the gap X, this means that the particle size of the processed material is increased by advancing the tube 15a into the base of the cyclone. Conversely, the more the tube 15a is withdrawn towards the position of FIG. 1, the smaller the dead zone 30, and therefore the smaller the particle size of the particles passing through the gap X.

The airflow stabilising device and/or the position of the tube 15a relative to the exterior 14 can be moved relative to the base of the cyclone during a processing run, but in general would be set up for recovery of a particular particle size at the start of a run.

Advancing the frusto-conical portion 14 of the device 13 further into the end of the cyclone will reduce the size of the annular gap X and thus slow the flow of product from the cyclone; withdrawing the frusto-conical portion 14 will increase the rate of flow of product from the cyclone. In operation, product tends to leave the annular gap X in spurts or batches due to the natural pulsing action of the cyclone. The size of the gap X is adjusted for the required particle size. Product leaving through gap X falls onto an angled chute 13a (shown diagrammatically in FIG. 1 only) so that the product is diverted away from the base of the cyclone immediately after leaving; this minimizes the risk of the processed product being entrained back into the base of the cyclone.

In general, it has been found that there is some airflow into the base of the cyclone through the gap X, causing some re-entrainment of product from the dead zone 30, but that this airflow is sufficiently low that the re-entrainment effect is not significant in practice.

For the apparatus to be used to maximum efficiency, and to enable a large variety of products to be processed under optimum conditions, it is necessary to be able to control the following variables accurately:—

1. The velocity of the air introduced at the top of the cyclone through air inlet duct 10.
2. The volume of the air introduced at the top of the cyclone through air inlet duct 10. Items 1 and 2 are controlled by controlling the speed of the blower 9.
3. The air pressure within the cyclone. This is controlled by control of the speed of the blower 9 in combination with the adjustment of the conical valve 7, which controls the back pressure in the cyclone, and the pressure of the air admitted into the cyclone by the stabiliser device 13.
4. The humidity of the air introduced through air inlet duct 10.
5. The humidity of the air introduced through the airflow stabilising device 13. Items 4 and 5 may be controlled together or independently by monitoring the humidity of the exhaust air expelled through duct 8 and adjusting the mix of exhaust air/atmospheric air supplied through the inlet duct 10 and to the stabiliser device 13 to achieve the required humidity.
6. The temperature at which drying takes place, i.e., the temperature inside the cyclone. This is controlled by adjusting the temperature of the air supplied through the inlet duct 10 and to the stabiliser device 13 and by providing the cyclone with more or less insulation, as required. Further control may be achieved by controlling the temperature and rate of admission of the material to be processed.
7. The moisture content and particle size of the final product. This is controlled by varying the input rate of the material to be processed through the device 11 in combination with the regulation of the pressure, velocity, temperature and humidity of the air supplied to the inlet duct 10 and to the stabiliser device 13, and the adjustment of the level of the lower end 6 of the control cone 5 relative to the lower edge 3a of the cylindrical portion 3.

In general, for given operating conditions, there is a fixed relationship between the particle size of the product after processing and its moisture content. However, if a higher moisture content is required without a change in the particle size, this can be achieved by closing down the conical valve 7 to reduce the amount of air vented to exhaust.

Figure 3:
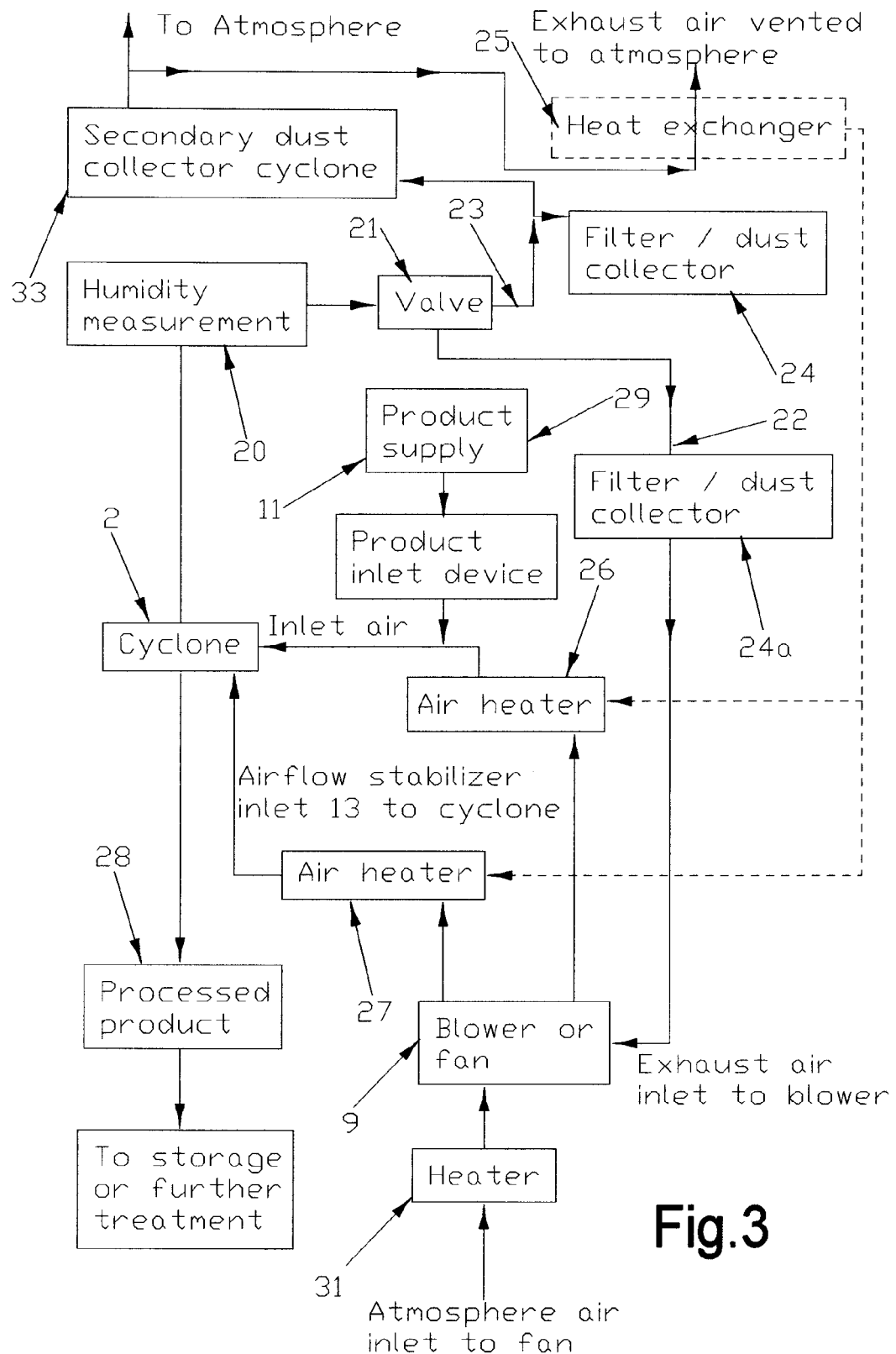
FIG. 3 is a flow diagram showing preferred methods of operation of the apparatus of the present invention.

FIG. 3 shows how the above described factors can be controlled independently to achieve optimum results for any specified product. It will be appreciated that any of the controllable factors may be manually controlled or may be centrally computer-controlled.

Referring to FIG. 3, the humidity of the exhaust air leaving the cyclone 2 through duct 8 is measured by a monitor 20 which controls a mixer valve 21. The mixer valve 21 directs a proportion of the exhaust air either to a line 22 leading to the inlet of the blower 9 or to a line 23 which is connected to a filter and/or dust collector 24 and optionally to a heat exchanger 25. A second filter and/or dust collector 24a may be connected between the valve 21 and the blower 9; however, this is not always necessary, because the cyclone recovers product very efficiently, so that there is a low risk of the exhaust air carrying product back to the blower 9, where it might burn on to the blower or heater. Depending upon the desired humidity of the air in the cyclone, the valve 21 adjusts the proportion of the exhaust air which is directed to the inlet of the blower 9 or vented to atmosphere via the filter 24 and heat exchanger 25. Alternatively, exhaust air can be directed through a second cyclone 33, for dust collection, before the air is exhausted to atmosphere, either directly or via heat exchanger 25.

Heat from the heat exchanger 25 can be supplied to either or both of the air heaters 26, 27 which can be used to heat respectively the inlet air supplied by the blower 9 to the inlet duct 10 and the air supplied by the blower 9 to the airflow stabilising device 13.

Sensors (not shown) inside the cyclone 2 record the pressure and humidity in the operating zones of the cyclone.

The blower 9 has separate outputs for the inlet duct 10 and the airflow stabilising device 13, to allow air to be supplied at different temperatures and velocities if necessary. However, for many products, air is supplied at the same velocity and pressure to both the inlet duct 10 and the stabilising device 13, in which case the blower may be connected to a single heater which supplies both the duct 10 and the device 13. Alternatively, the atmospheric air supplied to the blower 9 may be preheated by a heater 31.

Another possible configuration is to supply uncontrolled air to the airflow stabilising device 13 from ambient air, at ambient temperature and pressure. In this configuration, the airflow stabilising device 13 is not connected to the blower 9, and air is drawn through the tube 15a of the device 13 by the upward movement of air forming the second vortex.

The length of the tube 15a of the airflow stabilising device is such that air entering the base of the cyclone through this tube from atmosphere has its turbulence markedly reduced, if not eliminated, by the time it reaches the inner end of the tube.

The operator makes a decision as to whether to supply air to the airflow stabilising device from atmosphere or via the blower 9 based on the properties of the ambient air at the time of processing, the type of product which is being processed, and the available adjustment of the primary inlet airflow and the back pressure applied by the adjustment of the exhaust valve 7.

The general sequence of operation of the apparatus, from start-up, is as follows:—first, the setting of the conical valve 7 and the stabilising device 13 are adjusted to suitable settings for the product to be processed, and a suitable temperature for the cyclone inlet air is selected, based on data acquired from previous processing runs for that product.

Initially, the blower 9 is started to duct air to the inlet duct 10 and to the airflow stabilising device 13; if necessary, one or both streams of air are heated using the air heaters 26 and /or 27, or the heater 31. When the temperature monitors inside the cyclone indicate that the cyclone has reached the desired operating temperature, the product to be processed is fed into the inlet duct air stream through the device 11. At first, a slow feed rate is used, and as product starts to leave the cyclone through the gap X, the feed rate is gradually increased to the normal processing rate for that product.

The product being processed is swept into the cyclone by the stream of the air through the inlet duct 10, and travels in a substantially spiral path around the interior of the cyclone, as described above. The fully processed product leaves the cyclone through the gap X.

The drawings illustrate a single pass through a single cyclone only, but it will be appreciated that multiple passes can be made through a single cyclone, simply by returning the processed products from collection point 28 to product supply 29. Alternatively, two or more cyclones (of the same or different specification) may be used in series and/or in parallel.

The above described apparatus may be varied in a number of ways:—

1. The inlet air duct 10 may enter the cyclone at a point lower down the wall of the cyclone; the lower the point of entry, the shorter the dwell time of the product in the cyclone.
2. The inlet of the exhaust duct 8 and the associated core 5 can be offset from the longitudinal axis of the cyclone; the longitudinal axis of the duct 8 and core 5 may be parallel to, but horizontally offset from, the longitudinal axis of the cyclone.
3. Product to be processed can be fed into the cyclone entrained in the air stream entering through the airflow stabiliser device 13, rather than in the air stream entering through the inlet duct 10. With this method, air is still introduced into the cyclone through the inlet duct 10, but product is not fed into their air stream through the device 11, but through an equivalent device (not shown) located on the airline between the blower 9 and the device 13.

This method is particularly suitable for the processing of small experimental amounts of product.

4. The bottom of the cyclone may be closed apart from the device 13. In this case, rather than processed product leaving the cyclone through the gap X, the product is withdrawn from the cyclone through one or more outlets 65 (FIG. 2 only) formed in the wall of the frusto-conical portion 4 adjacent the bottom of the cyclone.
5. The wall of the frusto-conical portion 4 may be provided with a series of product withdrawal ports 66 (FIG. 1 only) spaced vertically down the length of the portion, so that particles may be removed from the cyclone at any of a selection of different particles sizes.

The dimensions and proportions of the cyclone and other apparatus may be varied widely, to suit the type and volume of product to be processed. Typical dimensions of a cyclone to be used for processing foodstuffs and other organic materials, including sawdust, at a rate in the range 50-400 kilograms of water evaporated per hour are as follows: —

Height of the cylindrical portion 3—1.5 m
Height of the frusto-conical portion 4—1.75 m
Diameter of the cylindrical portion 3—1.1 m
Diameter of the lower end of the frusto-conical portion 4—80 mm
Total volume of cyclone—2 cubic meters
Ratio of the volume of the cylindrical portion 3 to the frusto-conical portion 4—2.5:1.
Included angle at base of frusto-conical portion 4—in the range 28° to 40°, preferably 34°.
Width of annular gap X in the range 5 mm-15 mm.
Diameter of the bore 15—5.0 mm
Diameter of the cylindrical core 5—460 mm.
The diameter of the cylindrical core 5 is in the range 25 percent to 90 percent of the diameter of the cylindrical portion 3.

Velocity of inlet air through duct 10 and through the stabilising device 13: 35 m per second-120 m per second. Even higher velocities may be used for some product or to clean out the interior of the cyclone. However, the preferred velocity range for most product is 65-85 m per second.

Pressure of the inlet air—up to 1.8 bars above atmospheric pressure.

Temperature of the inlet air—in the range ambient –80° Centigrade.

The above-described apparatus has been found suitable for processing a very large range of materials, including the following:—marine products such as shellfish meat and shellfish shells, fish waste, fish and seaweed;

Cereal products such as wheat, maize, barley, brewers spent grain, stillage, gluten and flour; vegetables and herbs; fruit and nuts; wastes and nonbiological materials such as sawdust, newsprint, straws, bark, coal, concrete, feldspar, glass, clay and stone; animal products such as antlers, antler velvet, bone, bone marrow, cartilage and eggs. Liquid or semi liquid products such as egg white or gluten also can be processed successfully.

Examples of processing conditions for specific products:—

Example 1

Pre-Blanched Swede

Initial moisture content—89%
Final moisture content of powder—8%
Feed rate into cyclone—62 kg per hour
Processed product (powder) recovered from cyclone—9.5 kg per hour
Temperature of air supplied to duct 10 and device 13—75° Centigrade
Velocity of air supplied to duct 10 and device 13—95 m per second
Air volume supplied to duct 10 and device 13—2.360 cubic metres per second Example 2

Seaweed (*Macrocystis* sp.)

Initial moisture content—86 percent.
Final moisture content—8.2%.
Feed rate into cyclone—5.83 kg per minute.
Processed product recovered from cyclone—0.816 kg per minute.
Water evaporated—5.01 kg per minute.
Temperature of air supplied to duct 10 and device 13—85° Centigrade.
Velocity of air supplied to duct 10 and device 13—85 m per second.
Air volume supplied to duct 10—2.36 cubic metres per second.

Example 3

Sawdust initial moisture content—55 percent
final moisture content—16 percent
feed rate into cyclone—7.3 kg per minute
processed product recovered from cyclone—3.79 kg per minute
water evaporated—3.5 kg per minute temperature of air supplied to duct 10 and device 13—70° Centigrade
Velocity of air supplied to duct 10 and device 13—95 m per second
air volume supplied to duct 10—2.36 cubic metres per second.

What is claimed is:

1. A cyclone comprising: an upper cylindrical portion having a longitudinal axis, and a lower frusto-conical portion having an upper wide end and a lower narrow end and a longitudinal axis; said upper cylindrical portion being arranged to open into said upper wide end of said frusto-conical portion, with the longitudinal axes of said upper and lower portions substantially vertical and aligned to form the longitudinal axis of the cyclone; a primary air inlet into the cyclone arranged such that air admitted through said inlet is substantially tangential to the cyclone; an exhaust outlet at or adjacent the end of the cylindrical portion furthest from said frusto-conical portion; a control valve associated with said exhaust outlet and capable of partially or completely shutting off said exhaust outlet; a secondary air inlet associated with the narrow end of said frusto-conical portion and provided with an airflow stabilising device which is adapted to admit a stream of air substantially along or spirally around the longitudinal axis of the cyclone; means for removing processed product from the cyclone; means for moving said airflow stabilising device into and out of the narrow end of the frusto-conical portion during product processing and/or between product processing.

2. The cyclone as claimed in claim 1 wherein said airflow stabilising device has an exterior which is frusto-conical in shape and an interior tube through which air is supplied in use; said airflow stabilising device being dimensioned and arranged such that the narrow end of said frusto-conical exterior is insertable in the narrow end of said frusto-conical portion of the cyclone.

3. The cyclone as claimed in claim 2 wherein said interior tube is arranged to be movable into and out of the narrow end of the frusto-conical portion either together with and/or independently of the frusto-conical exterior of said airflow stabilising device.

4. The cyclone as claimed in claim 1 wherein said means for moving said airflow stabilising device includes a pair of spaced screw threaded rods which are screw threadedly engaged with a crossbar secured to said airflow stabilising device, such that rotation of said screw threaded rods relative to said crossbar moves said airflow stabilising device into or out of the narrow end of the frusto-conical portion of the cyclone, depending upon the direction of rotation of said screw threaded rods.

5. The cyclone as claimed in claim 4 wherein said screw threaded rods are rotatable by means selected from a group consisting of: manual rotation; electric motors; electric stepper motors.

6. The cyclone as claimed in claim 1 wherein said means for moving said airflow stabilising device is selected from a group consisting of: one or more hydraulic rams; one or more pneumatic rams.

7. The cyclone as claimed in claim 4 or claim 6 wherein said interior tube is a sliding fit within the frusto-conical exterior and is arranged to be movable into and out of the narrow end of the frusto-conical portion of the cyclone either together with and/or independently of the frusto-conical outer wall of said airflow stabilising device by means selected from a group consisting of: manual sliding adjustment; hydraulic ram; pneumatic ram.

8. The cyclone as claimed in claim 4 or claim 6 wherein said interior tube is a screw threaded fit within the frusto-conical exterior and is arranged to be movable into and out of the narrow end of the frusto-conical portion of the cyclone either together with and/or independently of the frusto-conical outer wall of said airflow stabilising device by means selected from a group consisting of: manual rotation; rotation by a drive connected to a motor.

9. The cyclone as claimed in claim 1, wherein said means of removing processed product from the cyclone comprises an annular gap at the narrow end of the frusto-conical portion between the end of the frusto-conical portion and the airflow stabilising device.

10. The cyclone as claimed in claim 1 wherein said means of removing processed product from the cyclone comprises one or more outlets formed in the wall of said frusto-conical portion of the cyclone.

11. The cyclone as claimed in claim 1, further comprising a cylindrical core having a longitudinal axis and mounted within the upper cylindrical portion of the cyclone, with the longitudinal axis of the cylindrical core parallel to, or coincident with, the longitudinal axis of said upper cylindrical portion.

12. The cyclone as claimed in claim 11 wherein said cylindrical core surrounds the exhaust outlet.

13. The cyclone as claimed in claim 12 wherein a diameter of the cylindrical core is in the range 25% to 90% of the diameter of a cylindrical portion.

14. The cyclone as claimed in claim 1 wherein the cylindrical portion of the cyclone has a first volume and the frusto-conical portion of the cyclone has a second volume, in a ratio of 2.5:1.

15. A method of operating a cyclone as claimed in claim 1 or claim 3, wherein the airflow stabilising device is supplied with air from a blower or fan.

16. A method of operating a cyclone as claimed in claim 1 or claim 3, wherein the airflow stabilising device is supplied with air by permitting air at ambient pressure to pass into said device.

17. The method as claimed in claim 15 or claim 16, wherein air supplied to said airflow stabilising device is at above ambient temperature.

18. A cyclone comprising:
an upper cylindrical portion having a longitudinal axis;
a lower frusto-conical portion having an upper wide end and a lower narrow end and a longitudinal axis, said upper cylindrical portion being arranged to open into said upper wide end of said frusto-conical portion, with the longitudinal axes of said upper and lower portions substantially vertical and aligned to form the longitudinal axis of the cyclone;
a primary air inlet into the cyclone arranged such that air admitted through said inlet is substantially tangential to the cyclone;
an exhaust outlet at or adjacent the end of the cylindrical portion furthest from said frusto-conical portion;
a control valve associated with said exhaust outlet and capable of partially or completely shutting off said exhaust outlet;
a secondary air inlet associated with the narrow end of said frusto-conical portion and provided with an airflow stabilising device which is adapted to admit a stream of air substantially along or spirally around the longitudinal axis of the cyclone;
a means for removing processed product from the cyclone; and
a means for moving said airflow stabilising device into and out of the narrow end of the frusto-conical portion during product processing and/or between product processing, said means for moving said airflow stabilizing device including one of at least one hydraulic ram and at least one pneumatic ram.

19. A cyclone comprising:
an upper cylindrical portion;
a lower frusto-conical portion having an upper wide end and a lower narrow end;
a primary air inlet into the cyclone arranged such that air admitted through said inlet is substantially tangential to a circumference of the cyclone;
an exhaust outlet at or adjacent the an end of the cylindrical portion furthest from said frusto-conical portion;
a control valve associated with said exhaust outlet and capable of partially or completely shutting off said exhaust outlet;
a secondary air inlet associated with the narrow end of said frusto-conical portion and provided with an airflow stabilising device which is adapted to admit a stream of air substantially along or spirally around a longitudinal axis of the cyclone;
a means for removing processed product from the cyclone; and
a means for moving said airflow stabilising device into and out of the narrow end of the frusto-conical portion during product processing and/or between product processing.

* * * * *